July 22, 1958

A. MEIER 2,844,744

ELECTROMAGNETIC DIRECT CURRENT MOTOR WITHOUT WINDING ON THE ARMATURE

Filed Sept. 19, 1955

INVENTOR
Alexander Meier.

INVENTOR
Alexander Meier.

July 22, 1958

A. MEIER 2,844,744

ELECTROMAGNETIC DIRECT CURRENT MOTOR
WITHOUT WINDING ON THE ARMATURE

Filed Sept. 19, 1955

INVENTOR
Alexander Meier

United States Patent Office 2,844,744
Patented July 22, 1958

2,844,744

ELECTROMAGNETIC DIRECT CURRENT MOTOR WITHOUT WINDING ON THE ARMATURE

Alexander Meier, Baltimore, Md.

Application September 19, 1955, Serial No. 534,969

4 Claims. (Cl. 310—46)

My invention is a direct-current motor, in which there is no winding on the armature. This type of motor can be operated on alternating current, and can also be used as a direct-current generator with outside excitation, supplied by any source of direct current.

This motor is designed on the basis of the well-known property of magnetic lines of force tending to shorten their length to a minimum. In this motor, this property is utilized by the armature's tendency to occupy a position in which the axis of its two poles coincides with the axis of two diametrically opposite poles of the stator, when electric current is flowing in the windings of this pair of poles.

This position of the armature corresponds to the minimum length of the magnetic flux of this pair of poles.

In order to impart rotary motion to the armature, I have designed a commutator which produces a rotating magnetic field and upon which the rotation of the armature depends entirely.

A preferred embodiment of my invention is illustrated in the attached drawings in which—

Figure 4C:
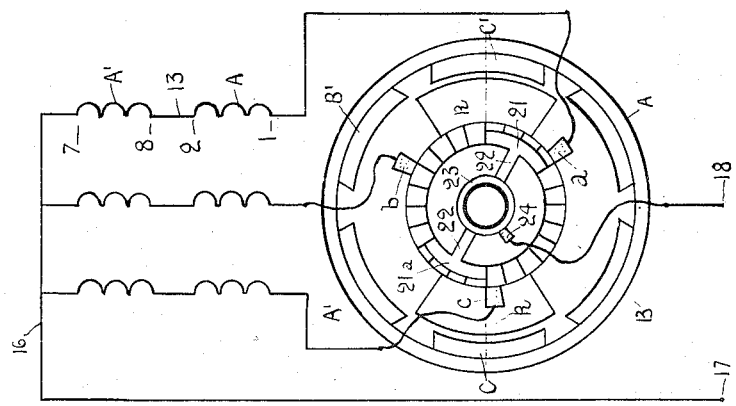
Figure 4B:
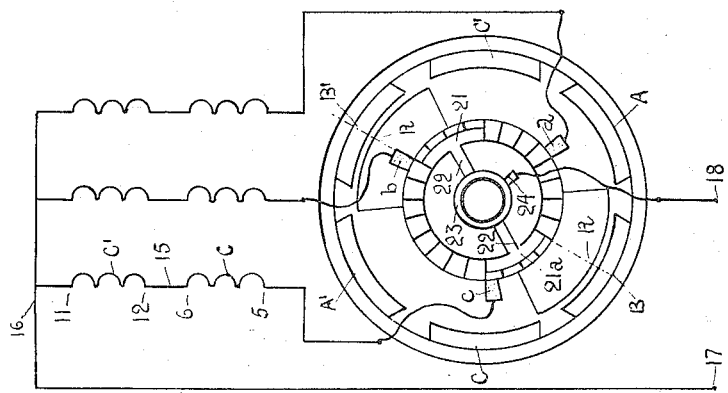
Figure 4A:
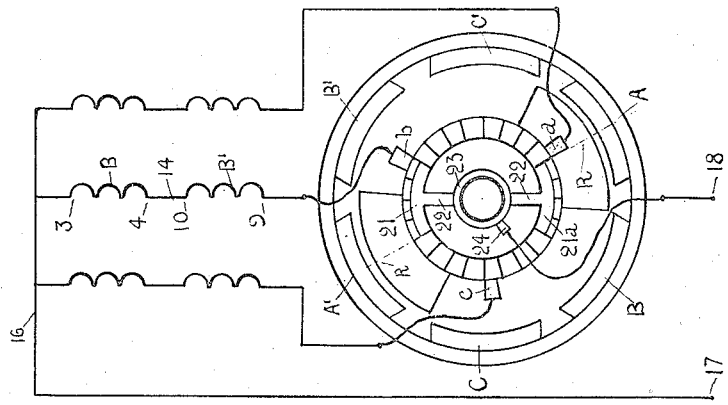

Figs. 4a, 4b, and 4c are schematic diagrams showing the steps in the cycles of operation during a half revolution.

Below is a detailed explanation of the action of commutation produced by the commutator, with reference to Fig. 4.

In order to employ the motor as a direct-current generator, on the stator poles there is a second winding, which, when connected to an outside source of direct current, creates a stationary six-pole magnetic field of alternating polarity.

A general illustration of the parts of the motor and schematic diagrams of the connections of the windings are shown in the four drawings.

Figure 1:
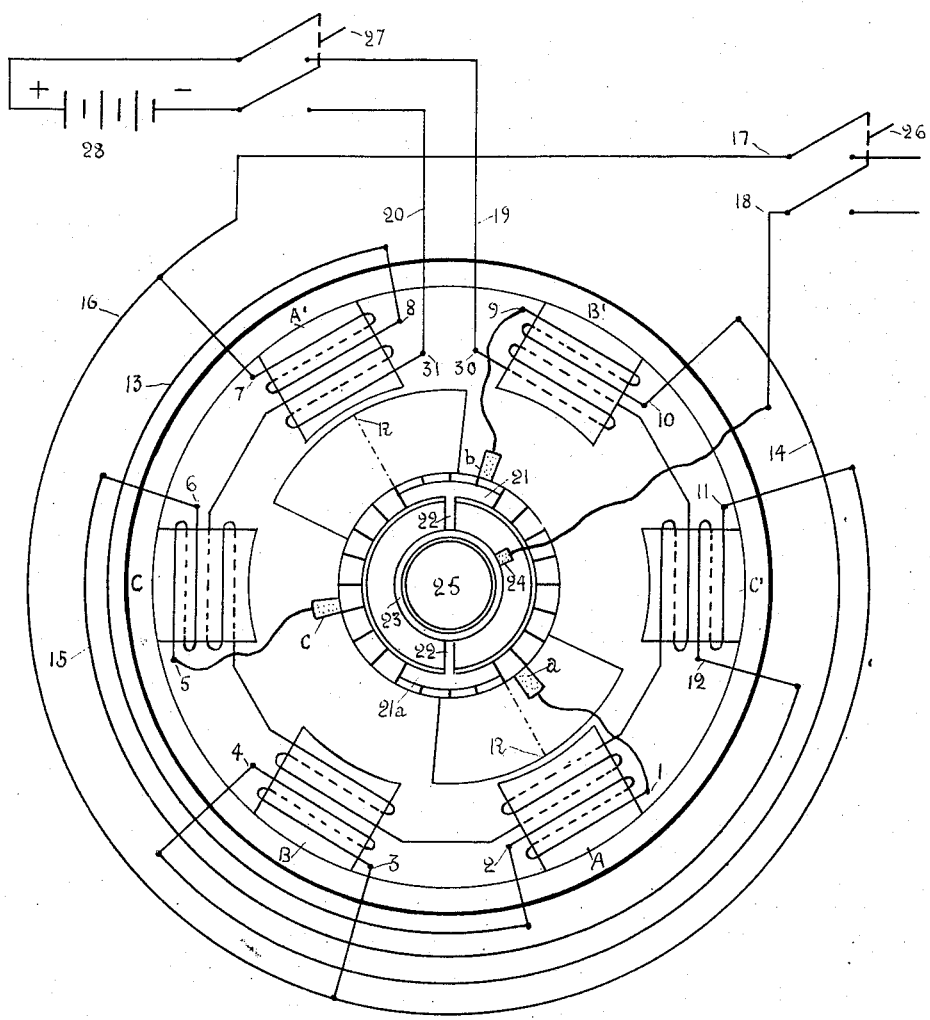
Fig. 1 is a wiring diagram in which the motor is shown in transverse section.

Referring to the drawings:

Fig. 1. Schematic diagram of the stator showing the armature located in the center; on the end of the shaft is the commutator with the three brushes a, b and c in contact with the latter.

The stator is of the same design as the stator of six-pole direct-current machines of existing types. For operating the motor on alternating current, the stator can be made of laminated iron plates, as in alternating-current motors. On the salient poles of the stator are windings A—A1, B—B1 and C—C1, which are connected in pairs in series. The numbers 1, 2, 3, 4, 5, 6, 7, 8, 9, 10, 11, 12 designate the ends of the windings of the poles.

13, 14 and 15—jumpers connecting the windings of the diametrically opposite poles.

16—jumper connecting ends 7, 3, 11 of the windings of poles A1, B and C1.

17, 18—leads to motor.

19, 20—leads supplying excitation windings for operating the generator.

21, 21a—current-carrying segments of commutator.

22, 22—jumpers connecting current-carrying segments of the commutator to the contact ring 23 on the armature shaft.

The brush 24 which slides on the contact ring on the armature shaft 25 is connected to lead 18, which is fastened on the end shield on the side opposite the position of the commutator.

A two pole switch 26 is provided for connecting leads 17, 18 to a source of power when the machine acts as a motor or to a load when acting as a generator, at which time the excitation windings are connected by means of switch 27 and leads 30, 31 to a battery 28 or other source of direct current.

Figure 2:
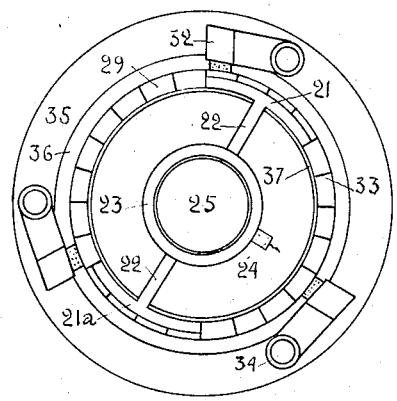
Fig. 2 is a showing of the commutator with cooperating brushes.

Fig. 2. Commutator.

The commutator is similar to that used in existing types of direct-current machines; it has 24 bars; it can have a greater number of bars, but the number must be even.

Two groups of bars 21, 21a each with four bars connected electrically to form two current-carrying commutator segments which are connected electrically through the armature shaft by means of jumpers 22.

Three brush-holders 32, mounted by bolts 34 on a brush gear 35 carry three brushes separated by 120 mechanical degrees. The commutator bars 29 are separated from each other by mica insulation 33 and form the commutator sleeve by insulation 37 as is usual. The brush gear 35 is rotatably supported on motor bearing yoke 36.

Figure 3:
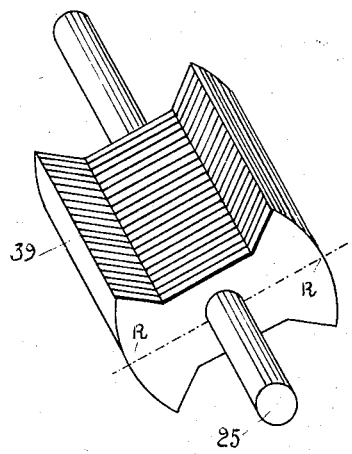
Fig. 3 is an isometric view of the rotor.

Fig. 3. Exterior view of armature, which is made of thin laminated iron sheets 39 forming two salient poles R—R. Each pole is included in an angle of 70 mechanical degrees.

The line R—R shows the axis of magnetic flux of the armature.

Fig. 4. Schematic diagram showing commutation produced by commutator and illustrating the action of rotation of the armature during one-half a revolution consisting of three cycles.

Cycle 1, Fig. 4a: The origin of rotation of the armature is taken as the position where armature axis R—R coincides with axis of poles A—A1. Brush b comes into contact with commutator segment 21, and current flows through lead 18, brush 24, contact ring 23, jumper 22, commutator segment 21, brush b, winding leads 9—10 of pole B1, jumper 14, leads 4—3 of pole B, jumper 16, and lead 17. The armature, under the action of the magnetic field produced by pole B—B1, which is short-circuited through the frame and armature, rotates 60 mechanical degrees, until axis R—R coincides with axis of poles B—B1. At this time, brush b comes out of contact with commutator segment 21 (see Fig. 4b), and brush c comes into contact with commutator segment 21a.

Thus ends cycle 1, and begins cycle 2.

Cycle 2, Fig. 4b: The current flows through lead 18, brush 24, contact ring 23, jumper 22, commutator segment 21a, brush c, leads 5—6 of pole C, jumper 15, leads 12—11 of pole C1, jumper 16, and lead 17.

Under the action of the magnetic field of poles C—C1, the armature, similarly to the preceding cycle, rotates another 60 mechanical degrees, until axis R—R coincides with axis of poles C—C1 (see Fig. 4c). Brush c comes out of contact with commutator segment 21a and brush a comes into contact with commutator segment 21. Thus ends cycle 2 and begins cycle 3.

Cycle 3, Fig. 4c: The current flows through lead 18, brush 24, contact rings 23, jumper 22, commutator segment 21, brush a, leads 1—2 of pole A, jumper 13, leads 8—7 of pole A1, jumper 16 and lead 17. Under the action of the magnetic field produced by poles A—A1, the armature rotates another 60 mechanical degrees, until axis R—R coincides with axis of poles A—A1 (see Fig. 4a). Thus ends cycle 3, after which the actions described above are repeated periodically during the entire time of rotation of the armature. The motor is started by turning on switch 26 (Fig. 1), and is turned off by turning off the switch.

To reverse the direction of rotation of the armature, it is necessary to rotate the brush gear and brush 60° in the same direction as the preceding direction of rotation of the armature. This can be done while the motor is in operation, without turning it off.

To employ the machine as a direct-current generator, with outside excitation, it is sufficient to rotate the armature by means of another motor and turn on switch 27 (see Fig. 1). The current flows from battery 28, through lead 19, lead 30, excitation windings of poles

B1—C1—A—B—C—A1 lead 31, lead 20 and switch 27, and returns to battery 28; across leads 17—18 is obtained a direct-current voltage.

I have built two working models of this machine, with which the above can be demonstrated.

I claim:

1. A dynamoelectric machine comprising a shaft, a laminated two pole rotor and a commutator on said shaft, said commutator having two diametrically opposed groups of electrically connected segments, a stator with six poles on each of which there are located two windings, the first windings of each pair of diametrically opposite poles being connected in series by means of jumpers to form three groups of windings, the ends of which groups on one side are connected to form a star the common point of which is adapted to be connected to one side of a power line by means including a lead, the other ends of these three groups of the said first windings being connected to three brushes positioned to alternately come into contact with said two groups of segments of the commutator, the said two groups of commutator segments being connected electrically to a contact ring on the armature shaft by means of two jumpers, means including a brush for connecting said contact ring to the other side of a power line, and means adapted to connect the second windings on said poles to power terminals.

2. The machine of claim 1 in which said commutator is located on the armature shaft and consists of twenty-four copper bars insulated from each other and mounted on a bushing from which the bars are also insulated, means electrically connecting together and to said contact ring two groups of four bars each to form two diametrically opposite current-carrying segments of the commutator, said three brushes adapted to engage the commutator at points 120 mechanical degrees apart, said brushes being held in brush holders mounted on brush gear and insulated therefrom.

3. The machine of claim 1 in which the armature poles do not have constant polarity but serve only as part of the magnetic circuit, and in which said brush gear is circumferentially adjustable to move the brushes over an arc of about 60 mechanical degrees to reverse the order of contact of the current-carrying commutator segments and the brushes, thereby to permit reversing the direction of rotation of the armature while the machine is in operation.

4. In a machine of claim 1, the said second winding of the six stator poles connected in series such that the polarity of the stator poles alternates as follows: N, S, N, S, N, S, means adapted to connect the said second winding to a source of direct current, the second winding of the stator poles serving to excite the stationary magnetic field of the stator when the motor is used as a direct-current generator with outside excitation.

References Cited in the file of this patent

UNITED STATES PATENTS

| | | |
|---|---|---|
| 440,699 | Dressler | Nov. 18, 1890 |
| 927,675 | Perkins | July 13, 1909 |
| 1,343,362 | Graham | June 15, 1920 |
| 1,367,982 | Lidseen | Feb. 8, 1921 |